United States Patent
Sato (10) Patent No.: US 11,031,893 B2
(45) Date of Patent: Jun. 8, 2021

(54) MOTOR CONTROL DEVICE

(71) Applicant: NIDEC TOSOK CORPORATION, Kanagawa (JP)

(72) Inventor: Kei Sato, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 16/813,756

(22) Filed: Mar. 10, 2020

(65) Prior Publication Data

US 2020/0313592 A1    Oct. 1, 2020

(30) Foreign Application Priority Data

Mar. 29, 2019   (JP) .............................. JP2019-068746

(51) Int. Cl.
| | |
|---|---|
| *H02K 11/00* | (2016.01) |
| *H02H 3/04* | (2006.01) |
| *H02H 7/08* | (2006.01) |
| *H02P 23/00* | (2016.01) |
| *H02P 23/16* | (2016.01) |

(52) U.S. Cl.
CPC .......... *H02P 23/0004* (2013.01); *H02P 23/16* (2016.02)

(58) Field of Classification Search
CPC .............................. H02P 23/0004; H02P 23/16

USPC ........................................................ 318/490
See application file for complete search history.

(56) References Cited

U.S. PATENT DOCUMENTS

| | | | |
|---|---|---|---|
| 2016/0190972 A1* | 6/2016 | Mori | H02M 7/5395 318/490 |
| 2019/0241214 A1* | 8/2019 | Oka | B62D 6/10 |
| 2019/0334442 A1* | 10/2019 | Iyasu | H02M 3/33515 |

FOREIGN PATENT DOCUMENTS

JP           2012016155        1/2012

* cited by examiner

*Primary Examiner* — Erick D Glass
(74) *Attorney, Agent, or Firm* — JCIPRNET (57) ABSTRACT

A motor control device includes a first control unit performing feedback control on a motor with a command value; one or plural second control units performing feedback control on the motor with a limit value; a control switching unit selecting, based on a deviation between the limit value and a measured value, one of the first and the one or plural of second control units as control unit. The first control unit has a first calculation unit calculating a control value, based on a deviation between the command value and a measured value of the motor related to the command value. Each second control unit has a second calculation unit calculating a control value, based on a deviation between the limit value and a measured value of the motor related to the limit value. The first and second calculation units share terms of a calculation expression of the control value.

10 Claims, 9 Drawing Sheets

MOTOR CONTROL DEVICE

CROSS REFERENCE TO RELATED APPLICATIONS

The present invention claims priority under 35 U.S.C. § 119 to Japanese Application No. 2019-068746, filed on Mar. 29, 2019. The entire content of which is incorporated herein by reference.

FIELD OF THE INVENTION

The disclosure relates to a motor control device.

BACKGROUND

For example, a motor control device is known which performs feedback control on a motor based on a current supplied to the motor and a motor rotational speed.

In the control apparatus described above, operation limitation of the motor can be performed depending on a state of a power-source voltage. However, in a case where it is necessary to perform control based on a command value and control based on a limit value, such as a case where operation limitation is performed on the motor due to overcurrent or the like during an operation thereof, the operation becomes unstable in some cases. For example, in a case where the overcurrent of the motor is prevented, when a determination is made that a current exceeds a limit value thereof, an operation for decreasing the current is started to decrease a rotational speed. Then, when the current is lower than the limit value, an operation for re-increasing the motor rotational speed is resumed. In this manner, whenever the current crosses the limit value, an opposing operation is repeatedly performed. Hence, the rotational speed of the motor may significantly change, and the operation of the motor may become unstable.

It should be noted that the introduction in Background is merely provided for the convenience of clearly and comprehensively describing the technical solutions of the disclosure and facilitating the understanding of those skilled in the art. These technical solutions shall not be deemed well-known by those skilled in the art simply for having been described in Background.

SUMMARY

An example embodiment of the disclosure provides a motor control device that controls rotation of a motor. The motor control device includes a first control unit that performs feedback control on the motor according to on a command value which is input from a host device; one or a plurality of second control units that perform feedback control on the motor according to a limit value for limiting an operation of the motor; and a control switching unit that selects, based on a deviation between the limit value and a measured value of the motor which is related to the limit value, any one control unit of the first control unit and the one or plurality of second control units as a control unit which executes control output to the motor. The first control unit has a first calculation unit that calculates a control value output to the motor, based on a deviation between the command value and a measured value of the motor which is related to the command value. The one or plurality of second control units respectively has a second calculation unit that calculates a control value output to the motor, based on a deviation between the limit value and a measured value of the motor which is related to the limit value. The first calculation unit and the one or plurality of second calculation units share a portion of terms of a calculation expression of the control value with each other.

The above and other elements, features, steps, characteristics and advantages of the present disclosure will become more apparent from the following detailed description of the preferred embodiments with reference to the attached drawings.

DESCRIPTION OF THE EMBODIMENTS

The foregoing and other features of the disclosure will become apparent from the following specification with reference to the accompanying drawings. Specific embodiments of the disclosure are disclosed in the specification and the accompanying drawings. The specification and the accompanying drawings describe several embodiments to which the principles of the disclosure are applicable. However, it should be understood that, the disclosure is not limited to the embodiments described herein, but shall include all modifications, variations and equivalents falling within the scope of the appended claims.

Figure 1:
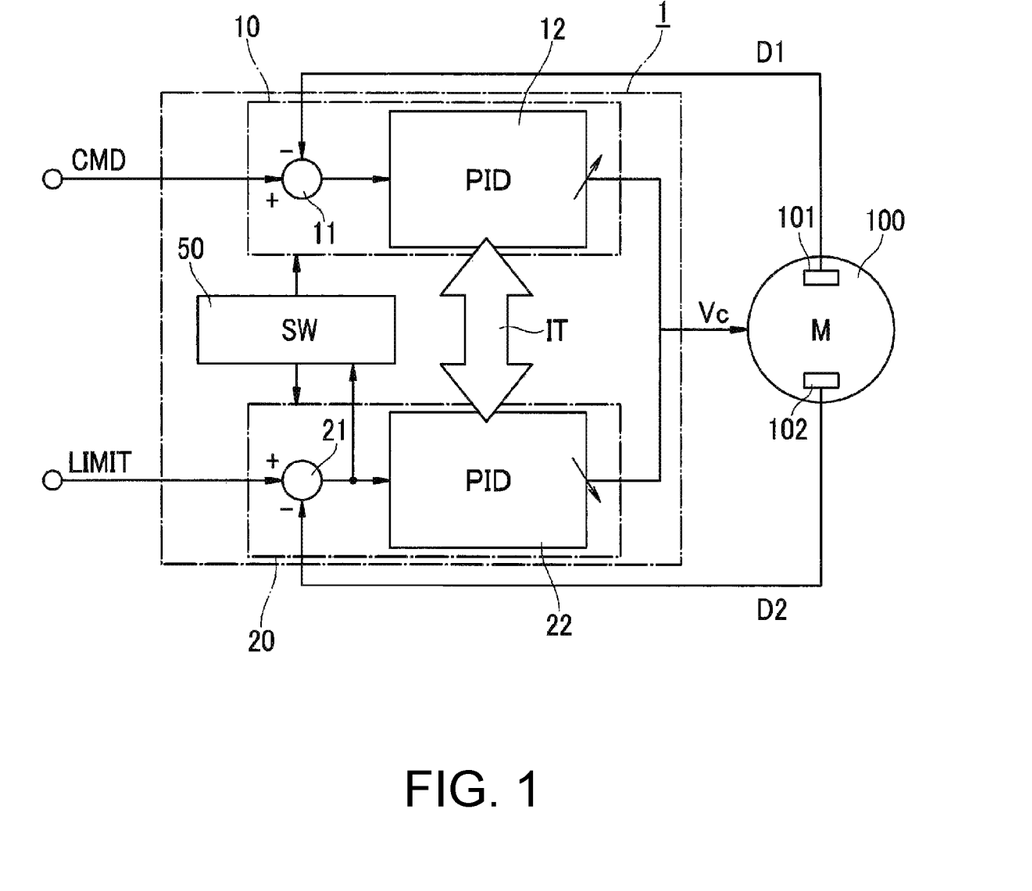
FIG. 1 is a diagram illustrating a configuration of a motor control device of a first embodiment.

As illustrated in FIG. 1, a motor control device 1 includes a first control unit 10, a second control unit 20, and a control switching unit 50. The motor control device 1 is connected to a motor 100. The motor control device 1 outputs a control value Vc to the motor 100 and controls an operational state of the motor 100.

The first control unit 10 performs feedback control on the motor 100 according to a command value CMD which is input from a host device. The second control unit 20 performs feedback control on the motor 100 according to a limit value LIMIT for limiting an operation of the motor 100. Both output terminals of the first control unit 10 and the second control unit 20 are connected to the motor 100. In other words, the first control unit 10 and the second control unit 20 are connected to the motor 100 in parallel.

The control switching unit 50 is connected to the first control unit 10 and the second control unit 20. An output of a subtractor 21, which will be described later, of the second control unit 20 is input to the control switching unit 50. The control switching unit 50 selects any one of the first control unit 10 and the second control unit 20 according to an operational state of the motor 100 and switches control for the motor 100. By a switching operation of the control switching unit 50, the control value Vc output to the motor 100 is a control value which is output from any one of the first control unit 10 and the second control unit 20.

Specifically, the control switching unit 50 switches a main control subject of the motor 100 between the first control unit 10 and the second control unit 20 based on a deviation between the limit value LIMIT and a measured value D2 which is related to the limit value LIMIT output from the motor 100. More specifically, the control switching unit 50 selects the first control unit 10 as the main control subject of the motor 100 in a period when the motor 100 performs a normal operation. In a period when the measured value D2 exceeds the limit value LIMIT and thereby the motor 100 comes into a limitation operation, the control switching unit 50 switches the main control subject of the motor 100 to the second control unit 20.

In the case of the embodiment, a combination of the command value CMD and the limit value LIMIT is a combination of a motor rotational speed and an upper limit value of a coil current. Moreover, the combination of the command value CMD and the limit value LIMIT is not limited thereto. For example, a second embodiment described later employ a combination in which the command value CMD is the coil current and the limit value LIMIT is an upper limit value of the motor rotational speed.

In addition, the command value CMD and the limit value LIMIT may be a physical quantity other than the motor rotational speed and the coil current. For example, the command value CMD and the limit value LIMIT may be torque of the motor 100, a motor temperature, vibration of the motor, or noise of the motor. In a third embodiment described later, a motor control device which operates based on the command value CMD and two limit values LIMIT is illustrated.

The motor 100 of the embodiment is a three-phase motor. In FIG. 1, although not illustrated, the motor 100 includes a main motor body having a rotor and a stator, an inverter circuit which generates a drive current that is applied to U-phase, V-phase, and W-phase coils of the stator, and a signal generation circuit which generates a pulse width modulation (PWM) signal that is supplied to the inverter circuit. In the case of the embodiment, the control value Vc output from the motor control device 1 to the motor 100 is a value indicating an electric-current control signal that is input to the signal generation circuit of the motor 100. Moreover, the configuration of the motor 100 described above is described as an example, and another configuration may be employed.

The motor 100 has a detector 101 that detects a state of the motor which is related to the command value CMD and outputs the detected state as a measured value D1 to the first control unit 10. In the embodiment in which the command value CMD is the motor rotational speed, the detector 101 is a rotational speed detector that detects the motor rotational speed. For example, the rotational speed detector may be a configuration including a position sensor such as a Hall element which detects a position of the rotor in the main motor body and a rotational speed calculation unit which computes the motor rotational speed based on an output of the position sensor. The position sensor used in the rotational speed detector may be a magnetoresistive element, a resolver, or an encoder.

The motor 100 has a detector 102 that detects a state of the motor which is related to the limit value LIMIT and outputs the detected state as a measured value D2 to the second control unit 20. In the embodiment where the limit value LIMIT is the upper limit value of the coil current, the detector 102 is a current detector that detects a current supplied to the coils. For example, the current detector may be a configuration including a shunt resistor that is connected to an output terminal of the inverter circuit of the motor 100 and a detection circuit that detects a current flowing to the shunt resistor.

The first control unit 10 has a subtractor 11 and a first calculation unit 12. The subtractor 11 computes a deviation between the command value CMD and the measured value D1 of the motor which is related to the command value CMD. An output terminal of the subtractor 11 is connected to the first calculation unit 12. The first calculation unit 12 calculates, based on the deviation computed by the subtractor 11, the control value Vc output to the motor 100. An output terminal of the first calculation unit 12 is connected to the motor 100.

The first calculation unit 12 determines the control value Vc by a proportional-integral-differential control (PID control). The first calculation unit 12 computes proportional, integral, and differential terms from a deviation in rotational speed between the command value CMD and the measured value D1 by using a proportionality (P) coefficient, an integral (I) coefficient, and a differential (D) coefficient, respectively. The first calculation unit 12 outputs a sum of the calculated proportional, integral, and differential terms as the control value Vc to the motor 100.

The first calculation unit 12 may be a calculation unit that calculates the control value Vc output to the motor 100 by a proportional-integral control (PI control). In this case, the first calculation unit 12 outputs a sum of the proportionality and integral terms as the control value Vc.

The first control unit 10 of the embodiment increases a rotational speed of the motor 100 toward the command value CMD which is a target rotational speed and allows the motor 100 to be maintained at a constant rotational speed after the rotational speed reaches the command value CMD. Even when the deviation between the measured value D1 and the command value CMD is zero, the first control unit 10 outputs, as the control value Vc, an electric-current control signal for rotating the motor 100 at a constant rotational speed. The first control unit 10 increases or decreases a value of the control value Vc according to the deviation between the measured value D1 and the command value CMD.

The second control unit 20 has the subtractor 21 and a second calculation unit 22. The subtractor 21 computes a deviation between the limit value LIMIT and the measured value D2 of the motor which is related to the limit value LIMIT. An output terminal of the subtractor 21 is connected to the second calculation unit 22 and the control switching unit 50. The second calculation unit 22 computes the control value Vc output to the motor 100 based on the deviation computed by the subtractor 21. An output terminal of the second calculation unit 22 is connected to the motor 100.

Similarly to the first calculation unit 12, the second calculation unit 22 computes the control value Vc by the PID controller. In the case of the embodiment, the second calculation unit 22 computes respective proportional, integral, and differential terms from a deviation in current value between the measured value D2 and the limit value LIMIT which is the upper limit value of the coil current. The second calculation unit 22 outputs a sum of the calculated proportional, integral, and differential terms as the control value Vc to the motor 100. The second calculation unit 22 may be a calculation unit that calculates the control value Vc by the PI controller.

The second control unit 20 of the embodiment performs feedback control on the motor 100 with the coil current being limited to the limit value LIMIT or lower. When the measured value D2 is equal to or smaller than the limit value LIMIT, the control switching unit 50 causes the motor 100 to normally operate by the first control unit 10. Hence, when the coil current is equal to or lower than the limit value LIMIT, the second control unit 20 is not the main control subject of the motor 100. On the other hand, when the measured value D2 exceeds the limit value LIMIT, the control switching unit 50 selects the second control unit 20 as the main control subject of the motor 100, and thus the motor 100 comes into the limitation operation. In the period when the motor 100 is under the limitation operation, the second control unit 20 outputs the control value Vc for decreasing the coil current to the motor 100.

In the embodiment, as illustrated in FIG. 1, the first calculation unit 12 and the second calculation unit 22 share an integral term IT of the control value Vc with each other. In other words, in the motor control device 1, the first calculation unit 12 and the second calculation unit 22 share a portion terms of a calculation expression of the control value Vc with each other. According to the above configuration, in the motor control device 1, for example, when the control subject of the motor 100 is switched from the first control unit 10 to the second control unit 20, the integral term of the control value Vc which is calculated by the second calculation unit 22 is a value obtained by adding a deviation of the subtractor 21 to an integral term previously calculated by the first calculation unit 12. Hence, the value of the control value Vc to be output does not significantly change between the first control unit 10 and the second control unit 20 which perform control with respect to target values different from each other. Thus, even when the first control unit 10 and the second control unit 20 give command on opposite operations to the motor 100, it is possible to inhibit the operational state of the motor 100 from rapidly changing, and it is possible to stabilize the operation of the motor 100.

For example, even when the first control unit 10 increases the rotational speed of the motor 100 during an operation of the motor 100 with the coil current reaching a value approximating to the upper limit value thereof, the integral term which is a principal term of the calculation expression of the control value Vc is shared with the second control unit 20. Therefore, the value of the control value Vc does not significantly change, and the rotational speed of the motor 100 does not rapidly increase.

In the embodiment, the first control unit 10 and the second control unit 20 are connected to the motor 100 in parallel. According to this configuration, when the control switching unit 50 switches the main control subject of the motor 100, the operational state of the motor 100 is also switched to an operational state corresponding on the main control subject almost without delay. Consequently, even when switching between the normal operation and the limitation operation is frequently performed, the rotational speed and the coil current of the motor 100 does not significantly increase or decrease, and it is possible to stably operate the motor 100.

Hereinafter, an operation of the motor control device 1 is specifically described with reference to FIGS. 2 to 5.

FIGS. 2 to 5 illustrate changes in rotational speed and coil current of the motor 100 together with elapse of time.

Figure 2:
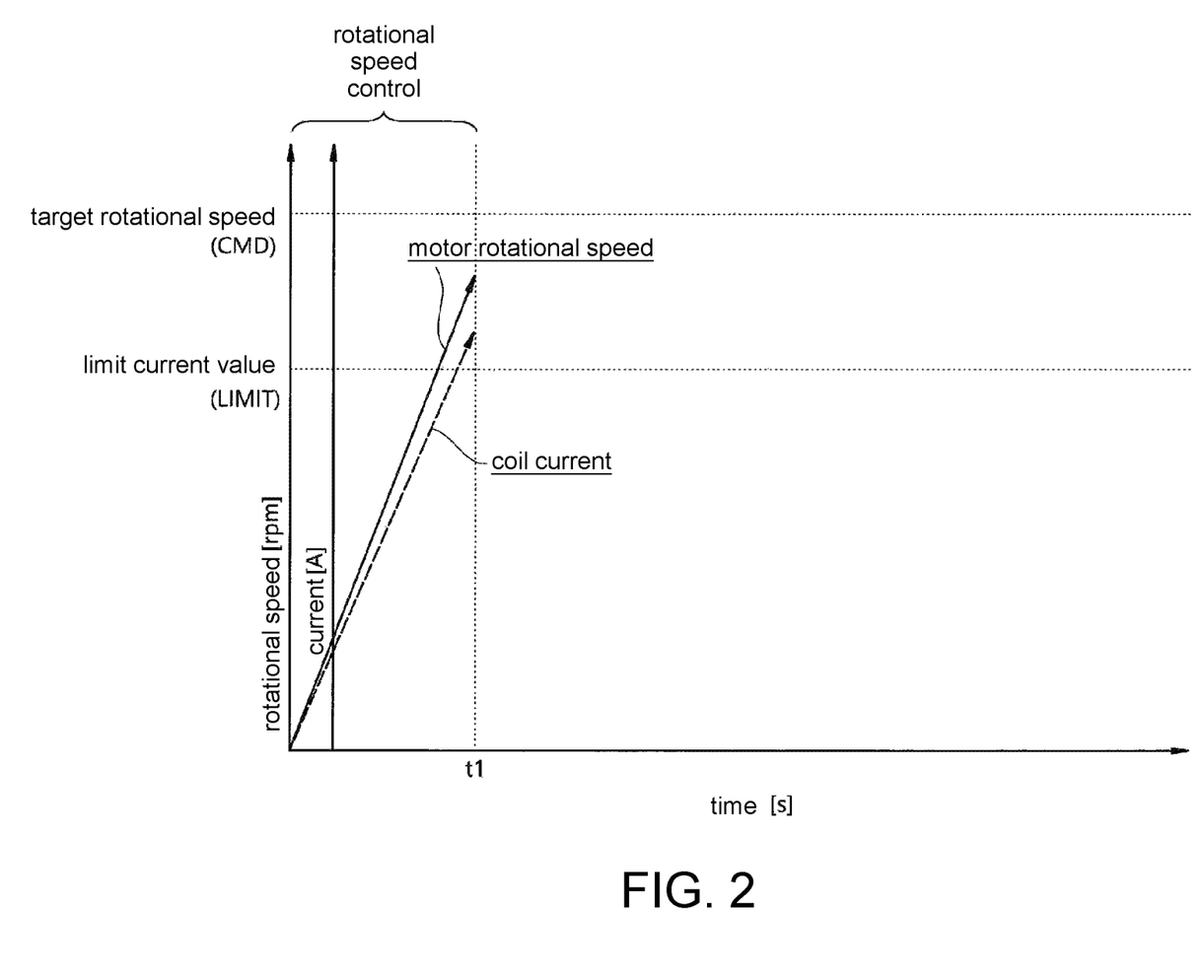
FIG. 2 is a graph illustrating an operation of the motor control device of the first embodiment.

When the motor control device 1 starts to drive the motor 100, the motor control device 1 starts to rotate the motor 100 as illustrated in FIG. 2. In this period, the coil current is lower than a limit current value (limit value LIMIT), and thus the control switching unit 50 selects the first control unit 10 as the main control subject of the motor 100. The first control unit 10 increases the motor rotational speed toward a target rotational speed (command value CMD). As the motor rotational speed increases, the coil current of the motor 100 also increases.

Figure 3:
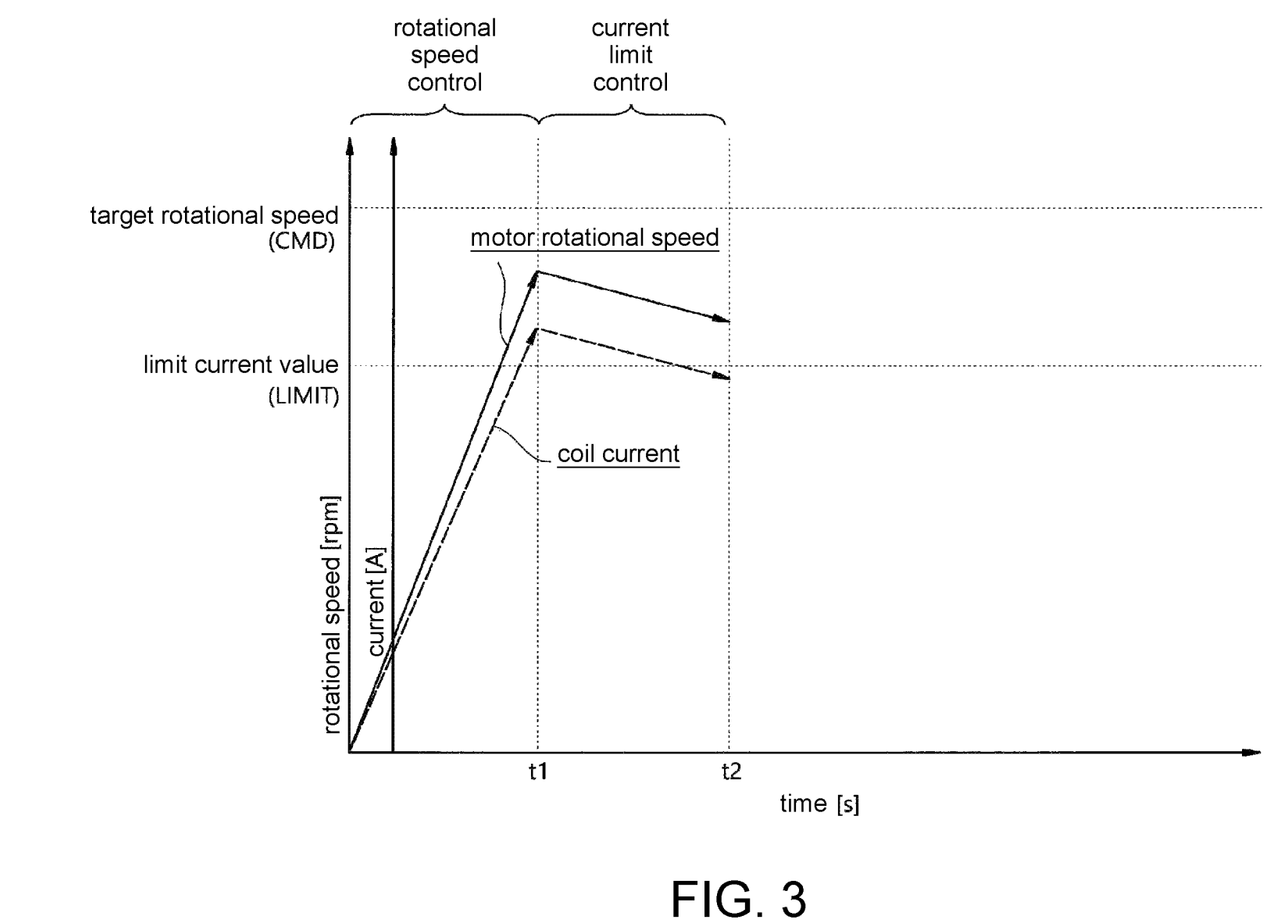
FIG. 3 is a graph illustrating an operation of the motor control device of the first embodiment.

Next, when the coil current exceeds the limit current value (limit value LIMIT) at a time point t1, the control switching unit 50 switches the main control subject of the motor 100 to the second control unit 20. Consequently, the second control unit 20 starts control for limiting the coil current to a value equal to or smaller than the limit current value, and the motor 100 comes into the limitation operation. When the second control unit 20 starts control for decreasing the coil current, as illustrated in FIG. 3, the coil current decreases toward the limit current value, and the motor rotational speed is also lowered accordingly.

Figure 4:
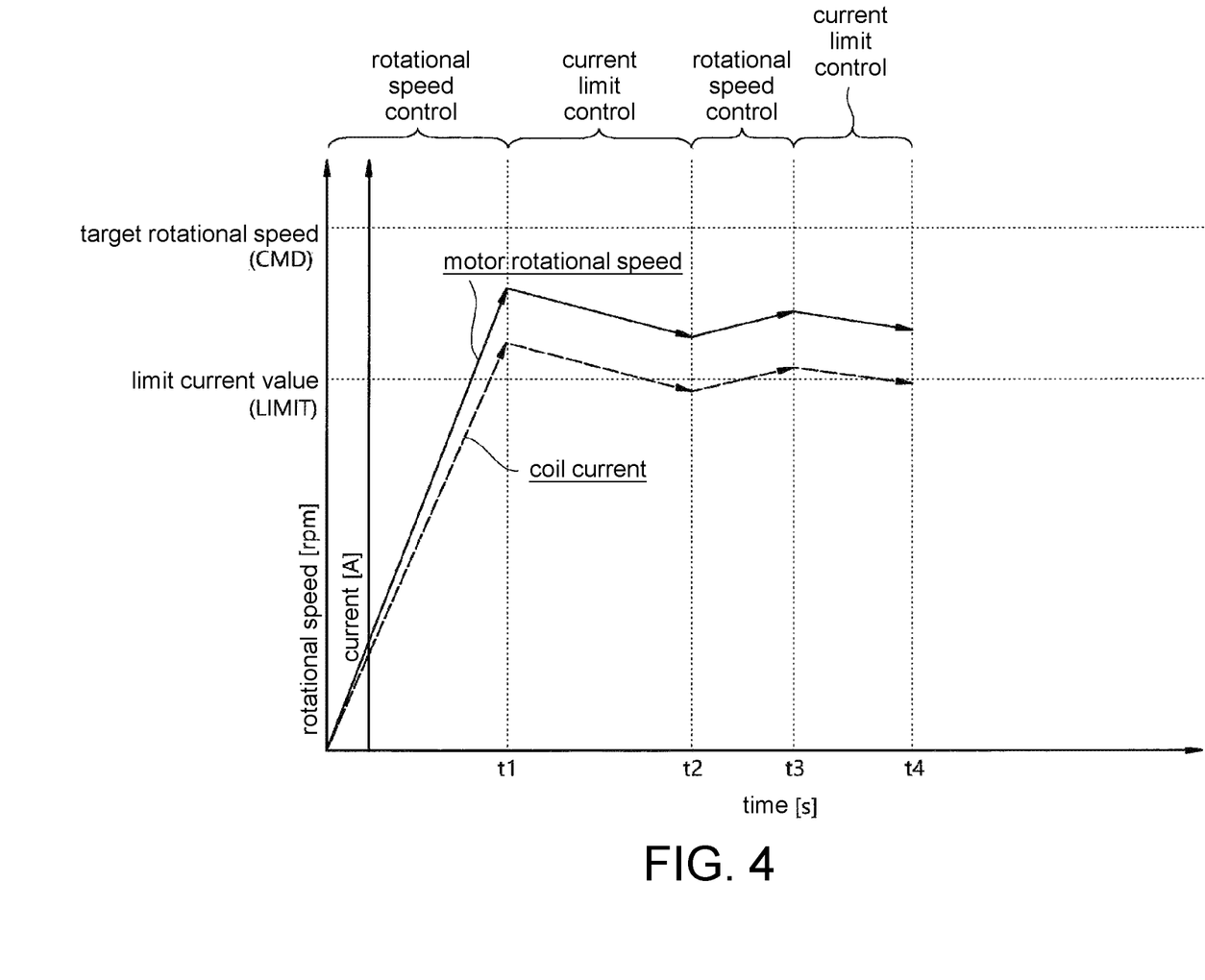
FIG. 4 is a graph illustrating an operation of the motor control device of the first embodiment.

Next, when the coil current is lower than the limit current value at a time point t2, the control switching unit 50 switches the main control subject of the motor 100 to the first control unit 10. Consequently, the motor 100 comes into the normal operation, and the motor rotational speed and the coil current increase again as illustrated in FIG. 4.

Then, when the coil current exceeds the limit current value again at a time point t3, the control switching unit 50 switches the main control subject of the motor 100 to the second control unit 20. Consequently, the coil current starts to decrease as illustrated in FIG. 4. Further, when the coil current is lower than the limit current value at a time point t4, the control switching unit 50 switches the main control subject of the motor 100 to the first control unit 10. The motor rotational speed increases again under the control performed by the first control unit 10.

Since the first calculation unit 12 of the first control unit 10 and the second calculation unit 22 of the second control unit 20 share an integral term of the PID controller with each other, the value of the control value Vc which is calculated by the first calculation unit 12 and the value of the control value Vc which is calculated by the second calculation unit 22 gradually approach each other as time elapses and substantially converge to a value taking the coil current of the motor 100 as the limit current value.

Even after the control value Vc becomes the value taking the coil current of the motor 100 as the limit current value, the control switching unit 50 performs the switching between the first control unit 10 and the second control unit 20 with the limit current value as a boundary, and control for increasing the rotational speed by the first control unit 10 and control for decreasing the coil current by the second control unit 20 are repeatedly performed.

Figure 5:
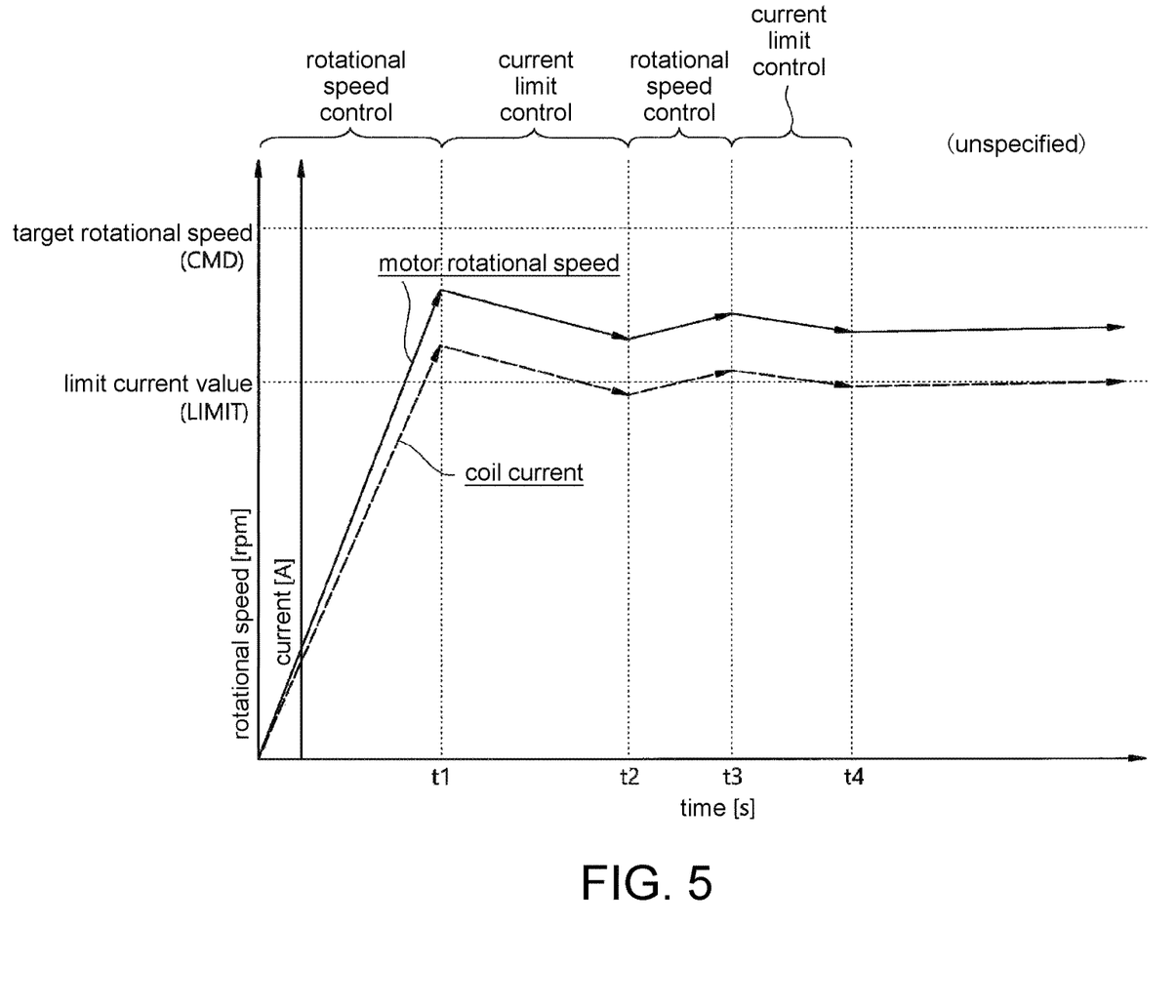
FIG. 5 is a graph illustrating an operation of the motor control device of the first embodiment.

In the embodiment, the first control unit 10 and the second control unit 20 are connected to the motor 100 in parallel. Therefore, after the control switching unit 50 switches the main control subject and before the coil current and the rotational speed of the motor 100 significantly change, the control performed by the switched main control subject is reflected into the operational state of the motor 100. In other words, the coil current starts to decrease immediately when the coil current exceeds the limit current value and the control performed by the second control unit 20 is started, and the coil current starts to increase immediately when the coil current becomes lower than the limit current value and the control performed by the first control unit 10 is started. Accordingly, as illustrated in FIG. 5, the coil current of the motor 100 becomes stable at the limit current value, and the motor rotational speed also becomes a substantially constant value.

As described above, according to the motor control device 1 of the embodiment, when the motor 100 is caused to come into the limitation operation, the motor can be stably operated without a significant increase or decrease in rotational speed of the motor 100.

For example, the motor control device 1 of the embodiment can be preferably used as a control device that controls a motor of an electric oil pump. In the electric oil pump, the motor is rotated at a motor rotational speed which is designated from a host device, and a fluid is pumped by the motor driving the pump. When a load increases in the electric oil pump, a coil current of the motor increases. The motor control device causes the motor to come into the limitation operation such that the coil current does not exceed the upper limit value. In the electric oil pump, the motor control device 1 of the embodiment can control the motor with the motor rotational speed as the command value CMD and the upper limit value of the coil current as the limit value LIMIT. According to the electric oil pump including the motor control device 1, it is possible to maintain a stable pumping rate even in the limitation operation.

Moreover, in the embodiment, a part of the entirety of the first control unit 10 and the second control unit 20 is stopped in a period in which one control unit does not become the main control subject of the motor 100. For example, the first control unit 10 is stopped in a period in which the motor 100 is in the limitation operation, and the second calculation unit 22 of the second control unit 20 is stopped in a period in which the motor 100 is in the normal operation. The subtractor 21 of the second control unit 20 is used in determination of the switch in the main control subject performed by the control switching unit 50, and thus the subtractor always operates.

Figure 6:
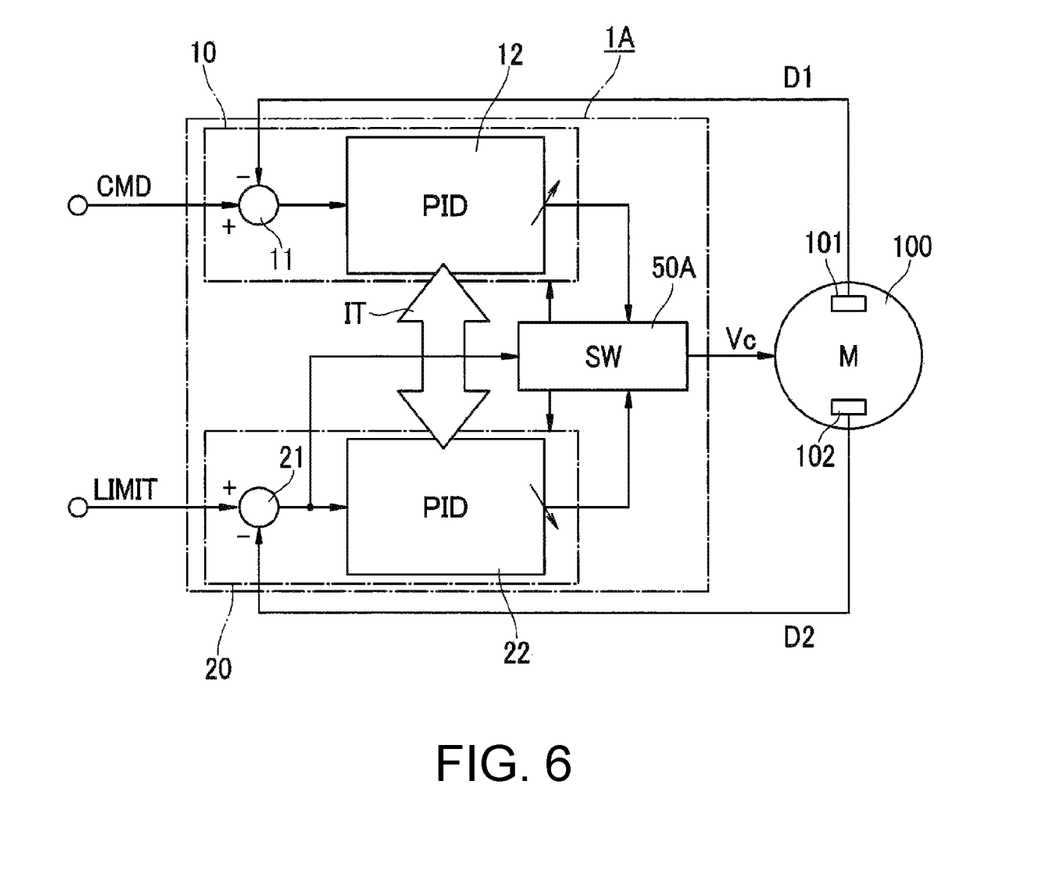
FIG. 6 is a diagram illustrating a configuration of a modification example of the first embodiment.

Alternatively, as illustrated in FIG. 6, a configuration in which outputs of the first control unit 10 and the second control unit 20 are selectively switched to be supplied to the motor 100 may be employed.

A motor control device 1A illustrated in FIG. 6 includes a control switching unit 50A that is connected to the output terminal of the first control unit 10 and the output terminal of the second control unit 20. An output terminal of the control switching unit 50A is connected to the motor 100. The output terminal of the subtractor 21 of the second control unit 20 is connected to the control switching unit 50A.

The control switching unit 50A supplies the output of the first control unit 10 or the output of the second control unit 20 to the motor 100 based on a deviation between the limit value LIMIT and the measured value D2. In other words, the control switching unit 50A supplies the output of the first control unit 10 to the motor 100 during the normal operation. On the other hand, when the coil current exceeds the limit current value, the control switching unit 50A supplies the output of the second control unit 20 to the motor 100.

In the motor control device 1A, when the motor 100 is caused to come into the limitation operation, the motor can also be stably operated without a significant increase or decrease in rotational speed of the motor 100.

Moreover, in the motor control device 1A, a part of the entirety of the first control unit 10 and the second control unit 20 may also be stopped in a period in which one control unit does not become the main control subject of the motor 100.

Figure 7:
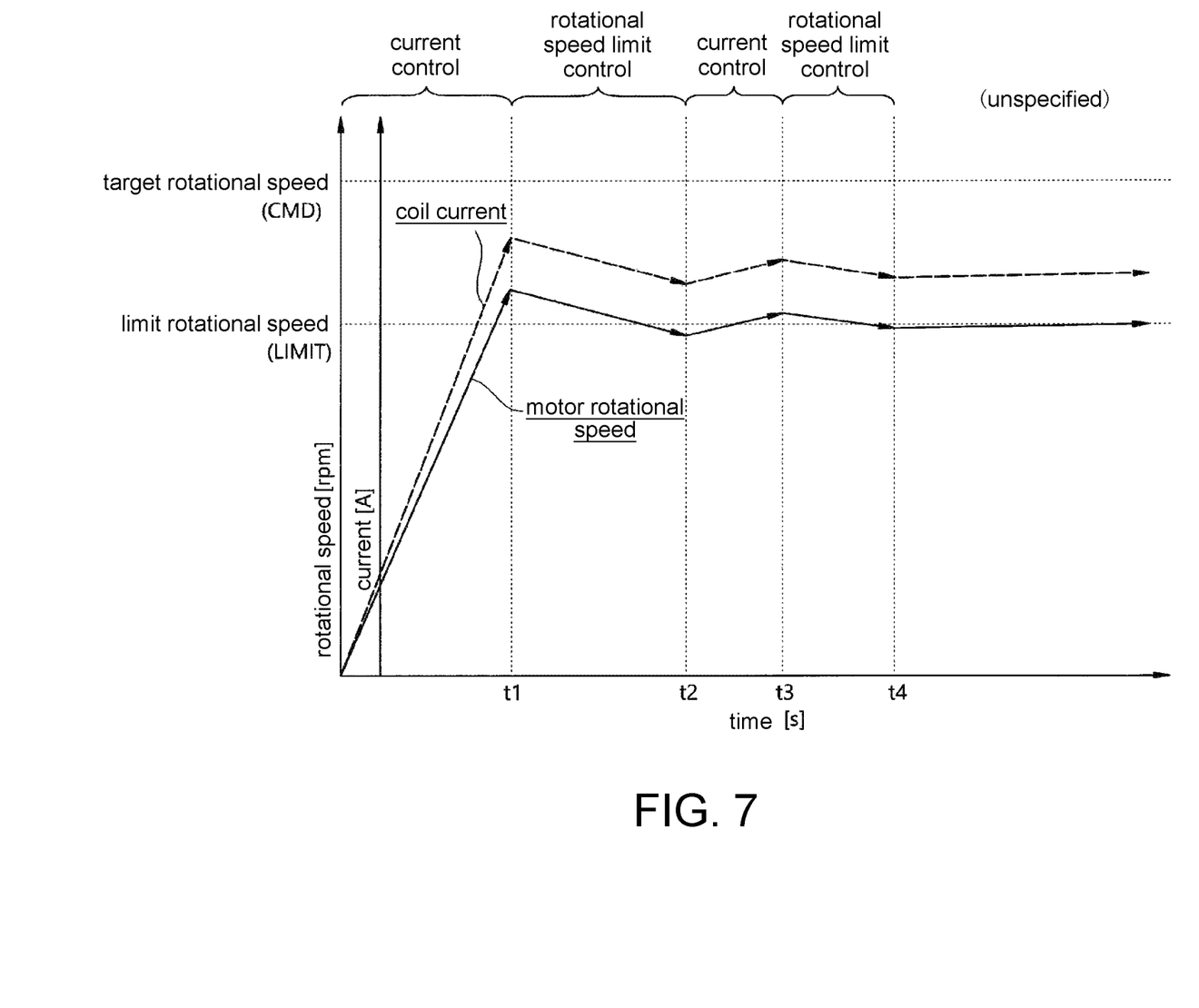
FIG. 7 is a graph illustrating an operation of a motor control device of a second embodiment.

FIG. 7 is a graph illustrating an operation of a motor control device of a second embodiment. A motor control device 1 of the second embodiment has the same configuration as that of the motor control device 1 illustrated in FIG. 1. The motor control device 1 of the second embodiment controls the motor 100 with the command value CMD as a target current value and the limit value LIMIT as an upper limit vale of the motor rotational speed. The configuration of the motor control device 1A illustrated in FIG. 6 may be applied as a configuration of the motor control device of the second embodiment.

As illustrated in FIG. 7, after the operation of the motor 100 starts, the motor control device 1 increases the coil current of the motor 100 toward the target current value (command value CMD). When the motor rotational speed exceeds a limit rotational speed (limit value LIMIT) at a time point t1, the control switching unit 50 switches the main control subject of the motor 100 to the second control unit 20. The second control unit 20 starts control for lowering the motor rotational speed, and the motor 100 comes into the limitation operation. Then, when the motor rotational speed is lower than the limit rotational speed at a time point t2, the control switching unit 50 switches the main control subject to the first control unit 10 again. The first control unit 10 increases the coil current, and the motor rotational speed increases. The operation described above is repeatedly performed, and thereby the rotational speed of the motor 100 substantially converges to the limit rotational speed. At the limit rotational speed, an increase operation of the control value Vc by the first control unit 10 and a decrease operation of the control value Vc by the second control unit 20 are balanced, and the motor 100 comes into a stable operational state.

As described above, the motor control device 1 can cause the motor 100 to stably come into the limitation operation even when the command value CMD is set as the target current value and the limit value LIMIT is set as the upper limit value of the motor rotational speed.

Figure 8:
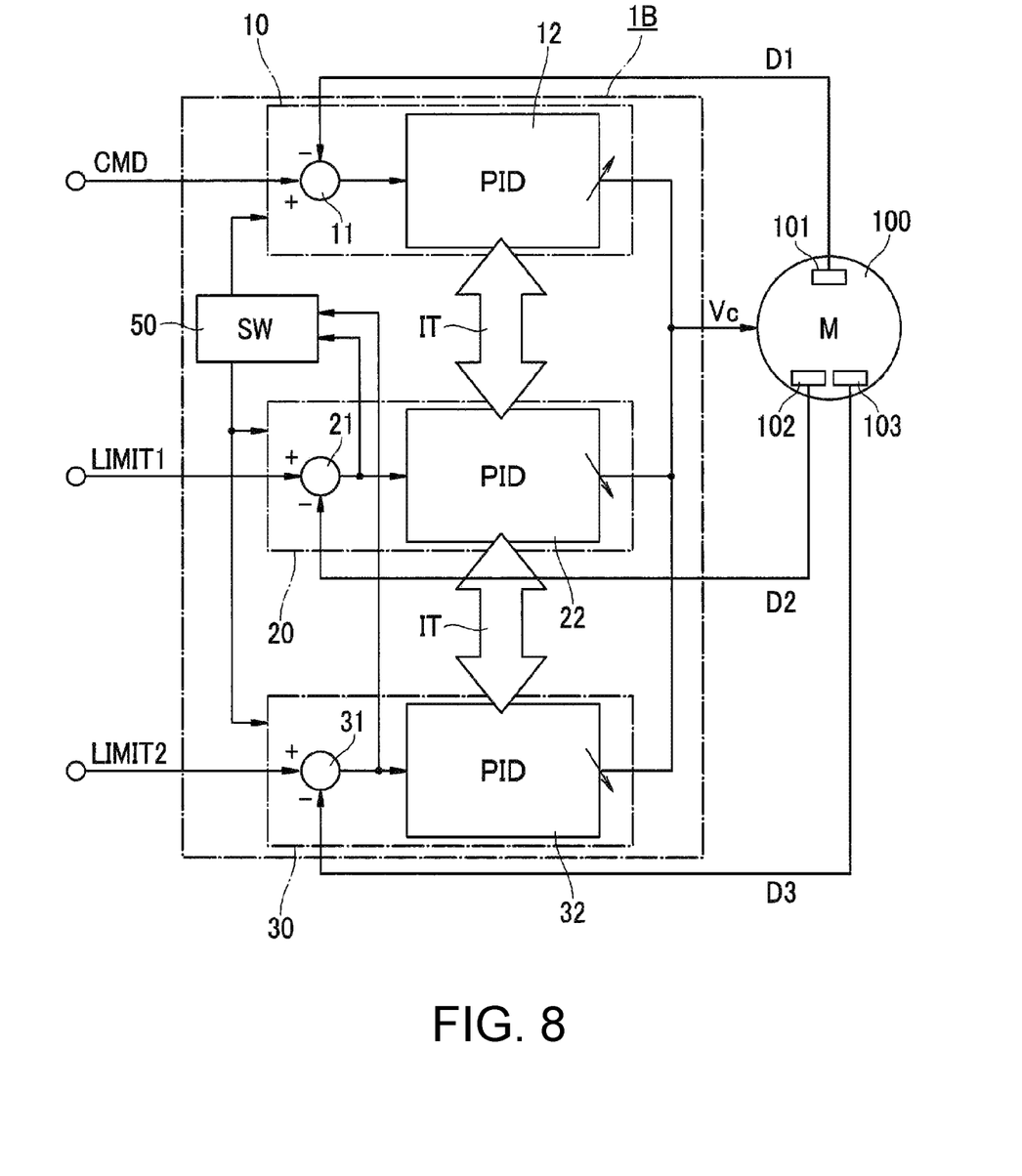
FIG. 8 is a diagram illustrating a configuration of a motor control device of a third embodiment.

FIG. 8 is a diagram illustrating a configuration of a motor control device 1B of a third embodiment. As illustrated in FIG. 8, the motor control device 1B includes the first control unit 10, two second control units 20 and 30, and the control switching unit 50. The motor control device 1B is connected to the motor 100. The motor control device 1B outputs the control value Vc to the motor 100 and controls the operational state of the motor 100.

The first control unit 10 performs feedback control on the motor 100 according to the command value CMD input from a host device.

The second control unit 20 performs feedback control on the motor 100 according to a first limit value LIMIT1 for limiting the operation of the motor 100.

The second control unit 30 performs feedback control on the motor 100 according to a second limit value LIMIT2 for limiting the operation of the motor 100.

The first control unit 10 and the second control units 20 and 30 are connected to the motor 100 in parallel.

The control switching unit 50 selects any one of the first control unit 10 and the two second control units 20 and 30 as the main control subject of the motor 100 according to the operational state of the motor 100. The output terminal of the subtractor 21 of the second control unit 20 and the output terminal of a subtractor 31 of the second control unit 30 are connected to the control switching unit 50.

All of the output terminals of the first control unit 10, the second control unit 20, and the second control unit 30 are connected to the motor 100. By on a switching operation of the main control subject performed by the control switching unit 50, the control value Vc output to the motor 100 is a control value output from any one of the first control unit 10, the second control unit 20, and the second control unit 30.

In the case of the embodiment, a combination is employed in which the command value CMD is set as the coil current and the first limit value LIMIT1 is set as the upper limit value of the motor rotational speed.

A third physical quantity other than the coil current and the motor rotational speed is selected as the second limit value LIMIT2. For example, the second limit value LIMIT2 is torque of the motor 100, a motor temperature, vibration of the motor, or noise of the motor. Hereinafter, the third physical quantity which is set as the second limit value LIMIT2 is referred to as a "physical quantity 3".

The motor 100 has a detector 103 that detects a state of the motor which is related to the second limit value LIMIT2 and outputs the detected state as a measured value D3 to the second control unit 30. For example, when the second limit value LIMIT2 is the motor temperature, the detector 103 is a temperature detection device that is installed at the coil of the motor 100.

The second control unit 30 has the subtractor 31 and a second calculation unit 32. The subtractor 31 computes a deviation between the second limit value LIMIT2 and the measured value D3 of the motor which is related to the second limit value LIMIT2. An output terminal of the subtractor 31 is connected to the second calculation unit 32 and the control switching unit 50. The second calculation unit 32 computes, based on the deviation computed by the subtractor 31, the control value Vc output to the motor 100. An output terminal of the second calculation unit 32 is connected to the motor 100.

Similarly to the first calculation unit 12 and the second calculation unit 22, the second calculation unit 32 computes the control value Vc by the PID controller. In the case of the embodiment, the second calculation unit 32 computes respective proportional, integral, and differential terms from a deviation in physical quantity between the measured value D3 and the second limit value LIMIT2 which is an upper limit value of the physical quantity 3. The second calculation unit 32 outputs a sum of the calculated proportional, integral, and differential terms as the control value Vc to the motor 100. The second calculation unit 32 may be a calculation unit that calculates the control value Vc by the PI controller. The second control unit 30 of the embodiment performs, on the motor 100, feedback control of limiting the physical quantity 3 to a value equal to or lower than the second limit value LIMIT2.

When the measured value D3 is equal to the second limit value LIMIT2 or is smaller than the second limit value LIMIT2, the second control unit 30 does not become the main control subject of the motor 100. On the other hand, when the measured value D3 exceeds the second limit value LIMIT2, the second control unit 30 is selected as the main control subject of the motor 100 by the control switching unit 50 and outputs the control value Vc for decreasing the physical quantity 3.

In the embodiment, as illustrated in FIG. 7, the first calculation unit 12, the second calculation unit 22, and the second calculation unit 32 share the integral term IT of the control value Vc with each other. In other words, in the motor control device 1B, the first calculation unit 12, the second calculation unit 22, and the second calculation unit 32 share a portion terms of the calculation expression of the control value Vc with each other.

Figure 9:
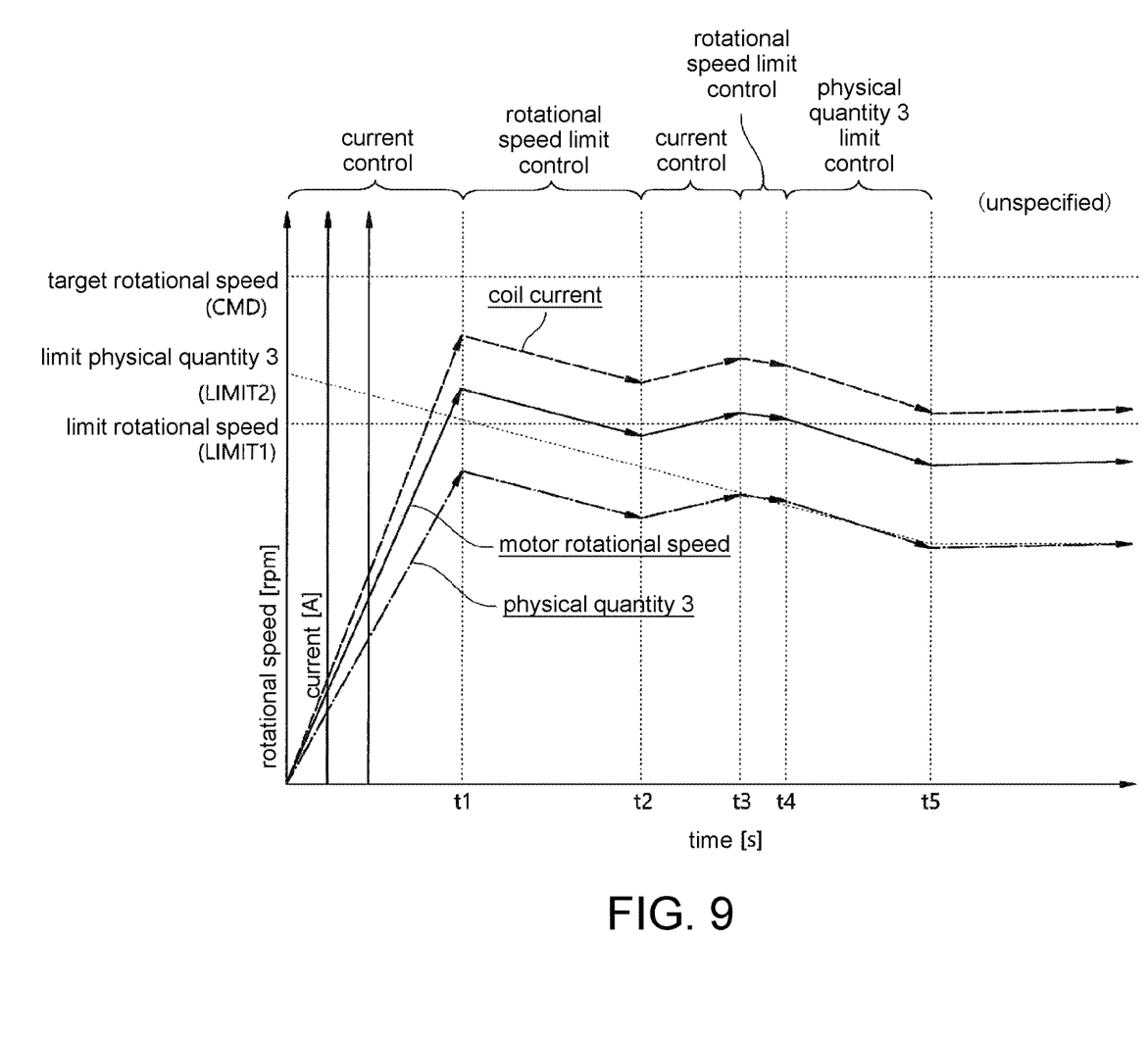
FIG. 9 is a graph illustrating an operation of the motor control device of the third embodiment.

FIG. 9 is a graph illustrating an operation of the motor control device of the third embodiment.

In the embodiment, a limit physical quantity 3 of the motor 100 decreases as time elapses, and the limit physical quantity 3 becomes a constant value from a time point t5.

When the motor control device 1B starts to drive the motor 100, the motor control device 1B starts to rotate the motor 100 as illustrated in FIG. 8. In this period, since the motor rotational speed is lower than the limit rotational speed (first limit value LIMIT1), and the physical quantity 3 is also smaller than the limit physical quantity 3 (second limit value LIMIT2), the control switching unit 50 selects the first control unit 10 as the main control subject of the motor 100.

The first control unit 10 increases the coil current toward the target current value (command value CMD). As the coil current increases, the rotational speed and the physical quantity 3 of the motor 100 also increase.

Next, when the motor rotational speed exceeds the limit rotational speed at a time point t1, the control switching unit 50 switches the main control subject of the motor 100 to the second control unit 20. Consequently, the motor 100 comes into the limitation operation in which the motor rotational speed is limited to become equal to or lower than the limit rotational speed. When the second control unit 20 starts control for decreasing the rotational speed, the motor rotational speed decreases toward the limit rotational speed, and the coil current is also lowered accordingly.

Next, when the motor rotational speed is lower than the limit rotational speed at a time point t2, the control switching unit 50 switches the main control subject of the motor 100. Since the physical quantity 3 is lower than the limit physical quantity 3 at the time point t2, the control switching unit 50 switches the main control subject of the motor 100 to the first control unit 10. Then, the first control unit 10 enables control for increasing the coil current, and thus the motor rotational speed and the coil current increase again.

Then, when the motor rotational speed exceeds the limit rotational speed again at a time point t3, the control switching unit 50 switches the main control subject of the motor 100 to the second control unit 20. Consequently, the motor rotational speed starts to decrease. Then, when the physical quantity 3 exceeds the limit physical quantity 3 (second limit value LIMIT2) at a time point t4, the control switching unit 50 switches the main control subject of the motor 100 to the second control unit 30. The motor 100 comes into the limitation operation in which the second control unit 30 limits the physical quantity 3 to a quantity equal to or lower than the limit physical quantity 3. When the second control unit 30 starts control for decreasing the physical quantity 3, the physical quantity 3 decreases toward the limit physical quantity 3, and the coil current and the motor rotational speed are also lowered accordingly in the case of the embodiment.

In the embodiment, the first calculation unit 12, the second calculation unit 22, and the second calculation unit 32 share the integral term of the PID controller with each other. In the motor control device 1B, during a period when the limitation operation is performed based on the limit physical quantity 3, the value of the control value Vc calculated by the first calculation unit 12 and a value of the control value Vc calculated by the second calculation unit 32 gradually approach each other as time elapses, and substantially converge to a value taking the physical quantity 3 of the motor 100 as the limit physical quantity 3.

Even after the control value Vc becomes the value taking the physical quantity 3 of the motor 100 as the limit physical quantity 3, the control switching unit 50 performs the switching between the first control unit 10 and the second control unit 30 with the limit physical quantity 3 as a boundary, and control for increasing the coil current by the first control unit 10 and control for decreasing the physical quantity 3 by the second control unit 30 are repeatedly performed. In this period, the first control unit 10 and the second control unit 30 are connected to the motor 100 in parallel, in the embodiment. Therefore, after the control switching unit 50 switches the main control subject and before the coil current and the rotational speed of the motor 100 significantly change, the control performed by the switched main control subject is reflected into the operational state of the motor 100. In other words, the physical quantity 3 starts to decrease immediately when the physical quantity 3 exceeds the limit physical quantity 3 and the control performed by the second control unit 30 is started, and the coil current and the physical quantity 3 start to increase immediately when the physical quantity 3 is lower than the limit physical quantity 3 and the control performed by the first control unit 10 is started. Consequently, as illustrated in FIG. 8, the coil current and the rotational speed of the motor 100 become substantially constant values from the time point t5.

As described above, according to the motor control device 1B of the embodiment, even when the motor 100 is caused to come into the limitation operation based on two parameters, the motor 100 can be stably operated without a significant increase or decrease in rotational speed, coil current, or the like of the motor 100.

Moreover, similarly to the motor control device 1A, in the motor control device 1B, the control switching unit is connected to the output terminals of the first control unit 10 and the second control units 20 and 30, and a configuration in which the control switching unit switches connection between the motor 100 and the first control unit 10 and the second control units 20 and 30 may be employed.

The embodiments of the disclosure are described in detail with reference to the accompanying drawings, which illustrate the examples to which the principles of the disclosure are applicable. It should be understood that the embodiments of the disclosure are not limited to those described above, but shall cover all variations, modifications, and equivalents within the scope of the disclosure.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor control device that controls rotation of a motor, the motor control device comprising:
   a first control unit that performs a feedback control on the motor according to a command value which is input from a host device;
   one or a plurality of second control units that perform feedback controls on the motor according to a limit value for limiting an operation of the motor; and
   a control switching unit that selects, based on a deviation between the limit value and a measured value of the motor which is related to the limit value, any one control unit of the first control unit and the one or plurality of second control units as a control unit which executes control output to the motor,
   wherein the first control unit comprises a first calculation unit that calculates a control value output to the motor, based on a deviation between the command value and a measured value of the motor which is related to the command value,
   wherein the one or plurality of second control units respectively comprises a second calculation unit that calculates a control value output to the motor, based on a deviation between the limit value and a measured value of the motor which is related to the limit value, and
   wherein the first calculation unit and the one or plurality of second calculation units share a portion of terms of a calculation expression of the control value with each other.

2. The motor control device according to claim 1, wherein the first calculation unit and the one or plurality of second calculation units are calculation units which calculate a control value of a PI control or PID control, and
   wherein the first calculation unit and the one or plurality of second calculation units share an integral term of the control value with each other.

3. The motor control device according to claim 1, wherein the first control unit and the one or plurality of second control units are connected to the motor in parallel.

4. The motor control device according to claim 2, wherein the first control unit and the one or plurality of second control units are connected to the motor in parallel.

5. The motor control device according to claim 1, wherein the control switching unit selectively switches connection between the motor and output terminals of the first control unit and the one or plurality of second control units.

6. The motor control device according to claim 2, wherein the control switching unit selectively switches connection between the motor and output terminals of the first control unit and the one or plurality of second control units.

7. The motor control device according to claim 3, wherein the control switching unit selectively switches connection between the motor and output terminals of the first control unit and the one or plurality of second control units.

8. The motor control device according to claim 1, wherein the measured value which is related to the command value is a motor rotational speed, and the measured value which is related to the limit value is a current value which is supplied to the motor.

9. The motor control device according to claim 2, wherein the measured value which is related to the command value is a motor rotational speed, and the measured value which is related to the limit value is a current value which is supplied to the motor.

10. The motor control device according to claim 1, wherein the measured value which is related to the command value is a current value supplied to the motor, and the measured value which is related to the limit value is a motor rotational speed.

* * * * *